US012577921B1

(12) United States Patent
Sarwar et al.

(10) Patent No.: US 12,577,921 B1
(45) Date of Patent: Mar. 17, 2026

(54) METHOD OF FUEL INJECTOR MANAGEMENT BASED ON CYLINDER KNOCK DETECTION AND VEHICLE INCLUDING THE SAME

(71) Applicant: GM GLOBAL TECHNOLOGY OPERATIONS LLC, Detroit, MI (US)

(72) Inventors: Azeem Sarwar, Rochester Hills, MI (US); Andrew B. Gillett, Bloomfield Township, MI (US); Joseph C. Ault, DeWitt, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 65 days.

(21) Appl. No.: 18/888,321

(22) Filed: Sep. 18, 2024

(51) Int. Cl.
*F02D 41/22* (2006.01)
*F02D 41/14* (2006.01)
*F02D 41/38* (2006.01)

(52) U.S. Cl.
CPC ......... *F02D 41/22* (2013.01); *F02D 41/1497* (2013.01); *F02D 41/38* (2013.01); *F02D 2041/224* (2013.01); *F02D 2041/389* (2013.01)

(58) Field of Classification Search
CPC ............... F02D 2041/224; F02D 41/38; F02D 41/1497; F02D 41/22
See application file for complete search history.

(56) References Cited

U.S. PATENT DOCUMENTS 4,711,212 A * 12/1987 Haraguchi .............. F02P 5/152 123/435
10,119,490 B1 * 11/2018 Surnilla ................ F02D 41/402
2013/0197784 A1 * 8/2013 Sakaguchi .............. F02D 41/34 701/104

FOREIGN PATENT DOCUMENTS

DE 102022119512 A1 2/2023
DE 112018005678 B4 10/2023
DE 102015202862 B4 5/2024
WO WO-2006011624 A1 * 2/2006 ......... F02D 41/3023

* cited by examiner

*Primary Examiner* — Kevin A Lathers
(74) *Attorney, Agent, or Firm* — Quinn IP Law

(57) ABSTRACT

A method of fuel injector management based on cylinder knock detection includes: receiving an individual cylinder knock count from a first cylinder; determining whether a knock metric is initialized for the first cylinder, whether the knock metric deviates from an established baseline knock metric after multiple cycles when the knock metric is initialized for the first cylinder, whether the knock metric is decreasing with respect to the established baseline knock metric when the knock metric deviates from the established baseline knock metric, whether a fuel system memory indicates rich, lean or healthy when that the knock metric is decreasing with respect to the established baseline knock metric, whether a knock adaptation control indicates a reduction of knock for the first cylinder, and updating a health status of a fuel injector based on the indication of rich, lean, or healthy.

20 Claims, 4 Drawing Sheets

METHOD OF FUEL INJECTOR MANAGEMENT BASED ON CYLINDER KNOCK DETECTION AND VEHICLE INCLUDING THE SAME

INTRODUCTION

The concepts described herein relate generally to vehicles powered, at least in part, by an internal combustion engine, more particularly to cylinder knock detection based fuel injector management systems for internal combustion engines, and a method of cylinder knock based fuel injector management.

Modern day internal combustion engines (ICEs) run at higher compression ratios and advanced spark to extract higher fuel economy and increased power from the ICE. Higher compression ratios combined with spark advancement may result in engine knock, which occurs when fuel burns unevenly in the ICE.

Systems that guard against knock generally include a knock sensor, and an engine control unit programmed with control logic that may retard the knocking cylinder(s), by causing the spark plug to generate a spark later, i.e., retarding the spark, in the compression stroke, thereby reducing engine detonation or "knock."

Fuel injector function may also influence knock. For example, an individual fuel injector shifted "rich" delivers more fuel to a cylinder, decreasing the probability of knock, as the extra fuel serves to cool the combustion chamber. While another individual fuel injector shifted "lean" delivers less fuel to a cylinder, also decreasing the probability of knock, as there is less fuel to experience detonation or "knock."

The function of an individual fuel injector may be indicative of the health of the individual fuel injector. That is, a shifted rich fuel injector, for example, may be leaky, resulting in a loss of refined fuel control and an increase in fuel delivery to a cylinder. While a shifted lean fuel injector, for example, may be plugged, resulting in a loss of refined fuel control and a decrease in fuel delivery to a cylinder.

As fuel economy requirements become more stringent, and/or power requirements increase, ICEs will invariably be required to operate in zones of, for example, higher compression ratios and/or advanced spark, where they will experience knock.

SUMMARY

In view of the above discussion, it is useful to develop a method of cylinder knock detection-based fuel injector management that utilizes a cylinder knock count of individual cylinders to assess a health of respective individual fuel injectors associated with the individual cylinders.

A method 200 of fuel injector management based on cylinder knock detection for an internal combustion engine having a plurality of cylinders may include: receiving, via a controller, an individual cylinder knock count from each of the plurality of cylinders.

The plurality of cylinders may include at least a first cylinder and a first fuel injector $Inj_1$ associated with the first cylinder. The individual cylinder knock count for the first cylinder may be received from one of a plurality of sensors, e.g., a knock sensor, during a current cycle.

The method may further include determining, via the controller, whether a knock metric is initialized for the first cylinder; determining, via the controller, whether the knock metric for the first cylinder deviates during the current cycle from an established baseline knock metric for the first cylinder when it is determined that the knock metric is initialized for the first cylinder; determining, via the controller, whether the knock metric for the first cylinder is decreasing with respect to the established baseline knock metric for the first cylinder when it is determined at that the knock metric or the first cylinder deviates from the established baseline knock metric for the first cylinder; determining, via the controller, whether a fuel system long term memory indicates one of rich, lean or healthy when it is determined that the knock metric for the first cylinder is decreasing with respect to the established baseline knock metric for the first cylinder; determining, via the controller, whether a knock adaptation control indicates a reduction of knock for the first cylinder; identifying, via the controller, the first fuel injector as shifted rich when it is determined that the fuel system long term memory indicates rich, and the knock adaptation control the reduction of knock for the first cylinder; and providing, via the controller, an alert when a rich residual metric exceeds a rich threshold metric when the first injector is identified as shifted rich.

According to one aspect of the disclosure, the method 200 may include receiving, via the controller, the individual cylinder knock count from each of the plurality of cylinders, when it is determined that the knock metric for the first cylinder does not deviate from the established baseline knock metric for the first cylinder prior to determining whether the knock metric is initialized.

According to one aspect of the disclosure, the method may include providing, via a controller, a first indicator, which may be indicative of, for example but not limited to, a combustion related event, when it is determined that the knock metric for the first cylinder is not decreasing with respect to the established baseline knock metric for the first cylinder, and/or providing, via the controller, a second indicator, which may be indicative of, for example but not limited to, a spark related event, when it is determined that the fuel system long term memory indicates healthy.

The method may further include: determining, via the controller, whether multiple misfires have been registered for the first cylinder, when it is determined that the fuel system memory indicates lean; identifying, via the controller, the first fuel injector as shifted lean, when it is determined that the fuel system memory indicates lean, multiple misfires have been registered for the first cylinder, and the knock adaptation control indicates the reduction of knock for the first cylinder; and providing, via the controller, an alert when a lean residual metric exceeds a lean threshold metric when the first injector is identified as shifted lean.

The method may further include updating, via the controller, a health status of the first fuel injector.

Updating the health status of the first fuel injector may include: calculating, via the controller, an allowable range of fuel injector pulse widths based on a fuel injector degradation factor and fuel injector nominal performance data when the first fuel injector is identified as shifted rich; and calculating, via the controller, the allowable range of fuel injector pulse widths and operating pressures based on the fuel injector degradation factor and fuel nominal performance data when the first fuel injector is identified as shifted lean.

The method may further include increasing, via the controller, an engine idle speed when the first fuel injector is identified as shifted rich, and/or increasing an engine idle speed, reducing a torque, and/or reducing a maximum allowable engine speed, via the controller, when the first fuel injector is identified as shifted lean.

According to one aspect of the disclosure, the method may further include: initializing, via the controller, the knock metric for the first cylinder when it is determined that the knock metric for the first cylinder is not initialized.

Initializing the knock metric for the first cylinder when is it determined at that the knock metric for the first cylinder is not initialized may include: determining, via the controller, whether a sum of the individual knock counts for the plurality of cylinders during the current cycle is greater than a knock threshold; determining, via the controller, a cylinder specific knock metric for the first cylinder for the current cycle and establishing, via the controller, a baseline knock metric for the first cylinder for the current cycle; determining, via the controller, a weighted average knock metric for the first cylinder based on the current cycle; and repeating, via the controller, the initialization of the knock metric for the first cylinder for at least one more cycle until the knock metric is initialized.

The sum of the individual knock counts of the plurality of cylinders for the current cycle is determined based upon a formula 1, which is defined as:

$$\sum_{i=1}^{n} \sum Cyl_{i-Knock} \quad [1]$$

where: i=a cylinder number from 1 to n;

n=a total number of cylinders in the plurality of cylinders; and $Cyl_{i-Knock}$=a total number of knock events for cylinder i.

The knock threshold is a calibratable value that is greater than one.

The cylinder specific knock count $$K_i^j$$

is determined based on a formula 2, which is defined as:

$$K_i^j = \frac{\sum Cyl_{i-Knock}}{\sum_{i=1}^{n} \sum Cyl_{i-Knock}} \quad [2]$$

where: K=a knock count i=a cylinder number from 1 to n;

j=the current cycle;

n=a total number of cylinders in the plurality of cylinders; and $Cyl_{i-Knock}$=a total number of knock events for cylinder i.

The weighted average knock ratio $$\mu_i^j$$

is determined based on a formula 3, which is defined as:

$$\mu_i^j = \alpha \cdot \mu_i^{j-1} + \beta \cdot K_i^j \quad [3]$$

where: μ=a knock ratio;

i=a cylinder number from 1 to n;

j=the current cycle;

α and β=scalar non-negative weights, such that α+β=1; and

K=a knock count.

According to one aspect of the disclosure, the baseline knock ratio may be established after a predetermined number of cycles N.

According to one aspect of the disclosure, the method may further include: determining, via the controller, whether the knock metric is initialized when it is determined that the sum of the individual knock counts for each of the plurality of cylinders during the current cycle is less than or equal to the knock threshold.

A fuel injector management system based on cylinder knock detection is also disclosed. The fuel injector management system may include an internal combustion engine having a plurality of cylinders and a plurality of fuel injectors associated with the plurality of cylinders, a plurality of sensors; and a controller having a memory. The controller is in communication with the internal combustion engine and the plurality of sensors.

The controller may be configured to: receive an individual cylinder knock count from each of the plurality of cylinders when the plurality of cylinders includes at least a first cylinder and a first fuel injector associated with the first cylinder. The individual cylinder knock count for the first cylinder may be received from a knock sensor (included in the plurality of sensors) during a current cycle.

The controller may be further configured to: determine whether a knock metric is initialized for the first cylinder; determine whether the knock metric for the first cylinder deviates from an established baseline knock metric for the first cylinder during the current cycle when it is determined that the knock metric is initialized for the first cylinder; determine whether the knock metric for the first cylinder is decreasing with respect to the established baseline knock metric for the first cylinder when it is determined that the knock metric for the first cylinder deviates from the established baseline knock metric for the first cylinder; determine whether a fuel system long term memory indicates one of rich, lean or healthy when it is determined that the knock metric for the first cylinder is decreasing with respect to the established baseline knock metric for the first cylinder; determine whether a knock adaptation control indicates a reduction of knock for the first cylinder; identify the first fuel injector as shifted rich when it is determined that the fuel system long term memory indicates rich, and the knock adaptation control the reduction of knock for the first cylinder; provide an alert when a rich residual metric exceeds a rich threshold metric when the first injector is identified as rich; determine whether multiple misfires have been registered for the first cylinder, when it is determined that the fuel system memory indicates lean; identify the first fuel injector as shifted lean, when it is determined that the fuel system memory indicates lean, multiple misfires have been registered for the first cylinder, and the knock adaptation control indicates the reduction of knock for the first cylinder; and provide an alert when a lean residual metric exceeds a lean threshold metric when the first injector is identified as lean.

The controller may be further configured to: update a health status of the first fuel injector. Updating the health status of the first fuel injector may include: calculating an allowable range of fuel injector pulse widths based on a fuel injector degradation factor and fuel injector nominal performance data when the first fuel injector is identified as shifted rich; and calculating the allowable range of fuel injector pulse widths and operating pressures based on the fuel injector degradation factor and fuel nominal performance data when the first fuel injector is identified as shifted lean.

A vehicle having the fuel injector management system based on cylinder knock detection in accordance with the method above is also disclosed. The vehicle may include an internal combustion engine having a plurality of cylinders, a controller having a memory, and a plurality of sensors, which includes, for example but not limited to a knock sensor.

By providing a method of cylinder knock detection-based fuel injector management that utilizes a cylinder knock count of individual cylinders to assess a health of respective individual fuel injectors associated with the individual cylinders, malfunctioning fuel injectors may be more readily identified, trend analysis of the malfunctioning fuel injectors may help assess fault severity, and management of the malfunctioning fuel injectors may minimize the adverse effects of operating a vehicle with shifted fuel injectors.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure which, taken together with the description, serve to explain the principles of the disclosure.

Figure 1:
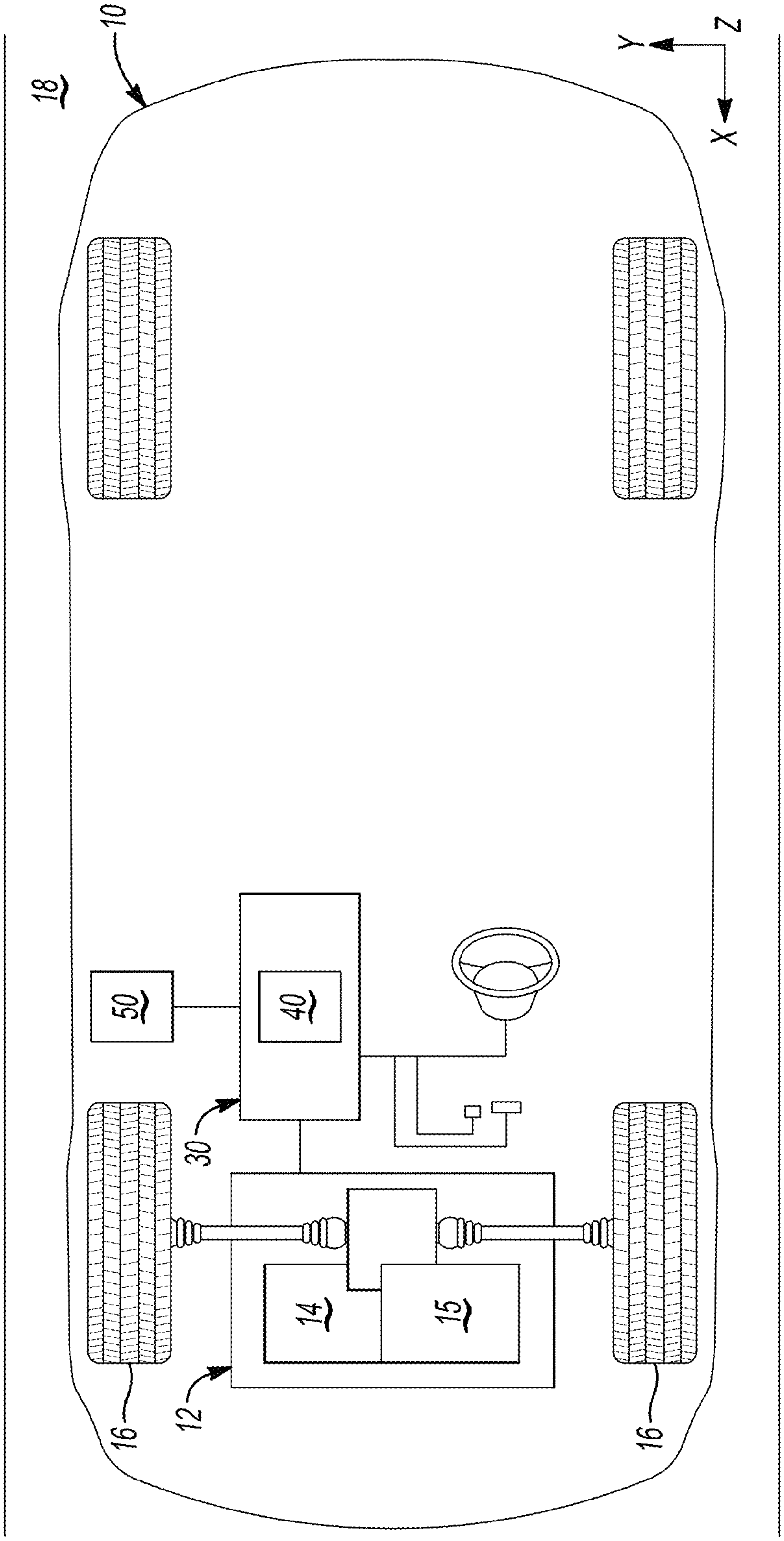
FIG. 1 is a schematic illustration of a vehicle including an internal combustion engine in accordance with the present disclosure.

The appended drawings are not necessarily to scale, and may present a somewhat simplified representation of various preferred features of the present disclosure as disclosed herein, including, for example, specific dimensions, orientations, locations, and shapes. Details adjacent to such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

Referring now to the drawings, wherein like numerals indicate like parts in several views, a method of cylinder knock detection-based fuel injector management that utilizes a cylinder knock count of individual cylinders to assess a health of respective individual fuel injectors associated with the individual cylinders, and an internal combustion engine and vehicle including the same, are shown and described herein.

As illustrated in FIG. 1, a vehicle 10 includes a powertrain 12. The vehicle 10 may include, but is not limited to, a commercial vehicle, an industrial vehicle, a passenger vehicle, an aircraft, a watercraft, a train or the like.

Figure 2A:
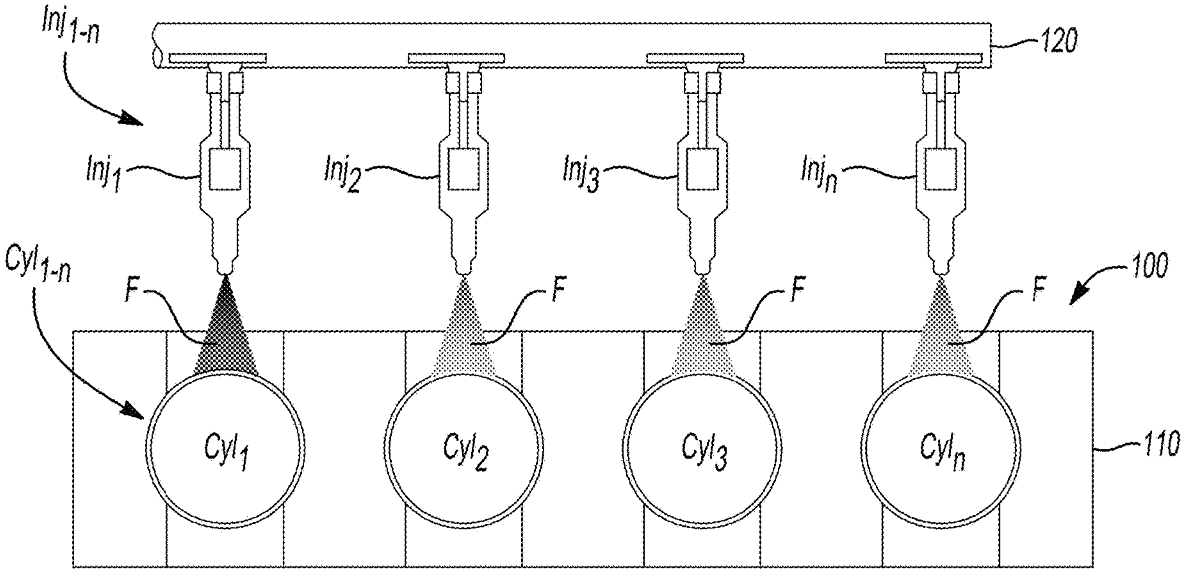
FIG. 2A is a schematic illustration of a cylinder head of an internal combustion engine including a fuel injector shifted rich.
Figure 2B:
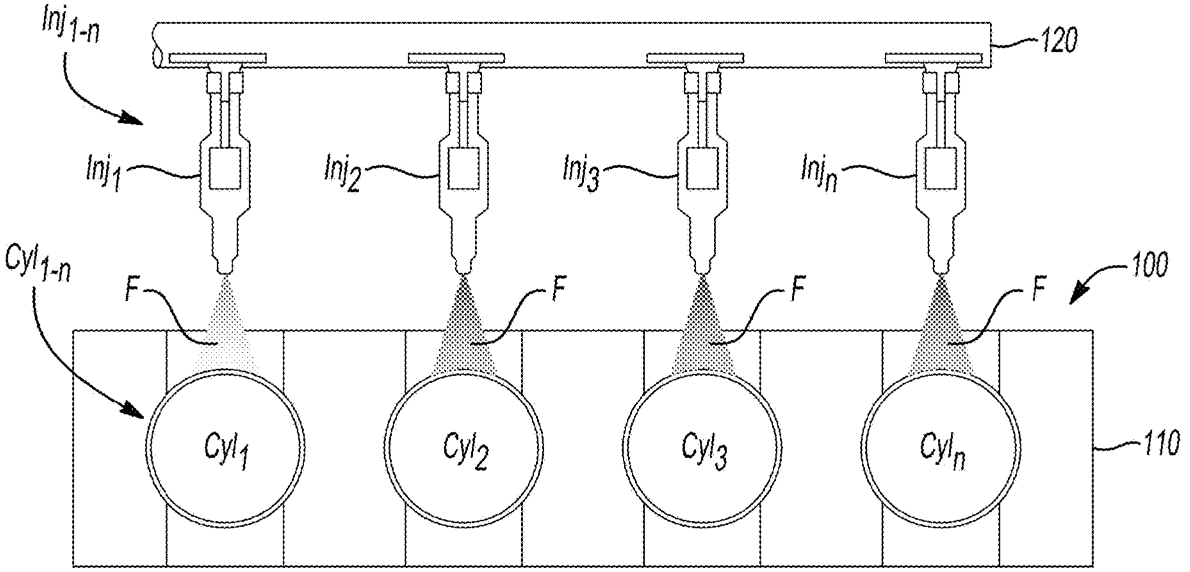
FIG. 2B is a schematic illustration of a cylinder head of an internal combustion engine including a fuel injector shifted lean.

The powertrain 12 includes a power-source 14 configured to generate a power-source torque T (not shown) for propulsion of the vehicle 10 via driven wheels 16 relative to a road surface 18. The power-source 14 is depicted as an internal combustion engine (ICE) having a plurality of cylinders $Cyl_{1-n}$ (FIGS. 2A and 2B).

As further illustrated in FIG. 1, the powertrain 12 may also include an additional power-source 15, such as an electric-motor generator. The power-sources 14 and 15 may act in concert to power the vehicle 10.

The controller 30 is in communication with the powertrain 12, and a plurality of sensors 50 including, for example but not limited to, a knock sensor $S_K$. The controller 30 is programmable and may include a central processing unit (CPU) that regulates various functions of the vehicle 10, the powertrain 12, and/or the plurality of sensors 50.

In either of the above configurations, the controller 30 includes a processor and tangible, non-transitory memory 40, which includes instructions for operation of vehicle 10, the powertrain 12, and the plurality of sensors 50 programmed therein. The memory 40 may be an appropriate recordable medium that participates in providing computer-readable data or process instructions. Such a recordable medium may take many forms, including, but not limited to, non-volatile media and volatile media.

Non-volatile media for the controller 30 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer, or via a wireless connection.

Memory 40 of the controller 30 may also include a flexible disk, hard disk, magnetic tape, another magnetic medium, a CD-ROM, DVD, another optical medium, etc. The controller 30 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 30 or accessible thereby, including, but not limited to predictive algorithms, may be stored in the memory 40 and automatically executed to provide the required functionality of the vehicle 10, the powertrain 12, and the plurality of sensors 50.

The controller 30 is disposed in the vehicle 10 and is in communication with the powertrain 12, the plurality of sensors 50, and the vehicle 10.

As schematically illustrated in FIGS. 2A and 2B, an internal combustion engine 14 (FIG. 1) includes at least one cylinder bank 100 having a cylinder head 110, and a fuel rail 120 having a plurality of fuel injectors $Inj_{1-n}$.

The cylinder head 110 includes a plurality of cylinders $Cyl_{1-n}$. The fuel rail 120 is operable to provide a fuel F to each of the plurality of cylinders $Cyl_{1-n}$ via each of the plurality of the fuel injectors $Inj_{1-n}$ respectively.

It should be appreciated that the internal combustion engine 14 may include more than one cylinder bank 100, and more than one fuel rail 120 as defined by each individual application.

It should further be appreciated that, while the plurality of cylinders $Cyl_{1-n}$, as illustrated, includes four cylinders, i.e., a first cylinder $Cyl_1$, a second cylinder $Cyl_2$, a third cylinder $Cyl_3$, and fourth cylinder $Cyl_4$, plurality of cylinders $Cyl_{1-n}$ may include more or less than four cylinders as defined by each individual application.

The plurality of fuel injectors $Inj_{1-n}$, as illustrated, includes four fuel injectors, i.e., a first fuel injector $Inj_1$, a second fuel injector $Inj_2$, a third fuel injector $Inj_3$, and a fourth fuel injector $Inj_4$, each of which is associated with a respective one of the plurality of cylinders $Cyl_{1-n}$. However, it should be appreciated that more than one fuel injector may be associated with each cylinder, as defined by each individual application.

During a combustion process, air and fuel F are provided to each of the plurality of cylinders $Cyl_{1-n}$ at an air/fuel (A/F) ratio. When air and fuel are provided at a stoichiometric or ideal A/F ratio, a chemically complete combustion event occurs.

Knock occurs when the fuel F ignites unevenly or prematurely in one or more of the plurality of cylinders $Cyl_{1-n}$.

As illustrated in FIG. 2A, the first fuel injector $Inj_1$ is shifted rich, i.e., the A/F ratio is lower than the stoichiometric or ideal A/F ratio resulting in chemically incomplete combustion. As the excess fuel F causes cooling, the probability that the first cylinder $Cyl_1$ will experience knock decreases.

In FIG. 2A, the first cylinder $Cyl_1$ to receiving too much fuel F from the first fuel injector $Inj_1$ and too little air, while the second cylinder $Cyl_2$, the third cylinder $Cyl_3$, and the fourth cylinder $Cyl_4$ are running nominal, i.e., the second cylinder $Cyl_2$, the third cylinder $Cyl_3$, and the fourth cylinder $Cyl_4$ are each receiving the stoichiometric air-fuel mixture, or ideal ratio, of air to fuel, which may decrease or prevent knock.

As compared to FIG. 2B, in which the first fuel injector $Inj_1$ is shifted lean, i.e., the A/F ratio is higher than the stoichiometric or ideal A/F ratio resulting in chemically incomplete combustion. As there is less fuel to cause knock, the probability that the first cylinder $Cyl_1$ will experience knock also decreases.

In FIG. 2B, the first cylinder $Cyl_1$ to receiving too much fuel F from the first fuel injector $Inj_1$ and too much air, while the second cylinder $Cyl_2$, the third cylinder $Cyl_3$, and the fourth cylinder $Cyl_4$ are running nominal, i.e., the second cylinder $Cyl_2$, the third cylinder $Cyl_3$, and the fourth cylinder $Cyl_4$ are each receiving the stoichiometric air-fuel mixture, or ideal ratio, of air to fuel.

Figure 3:
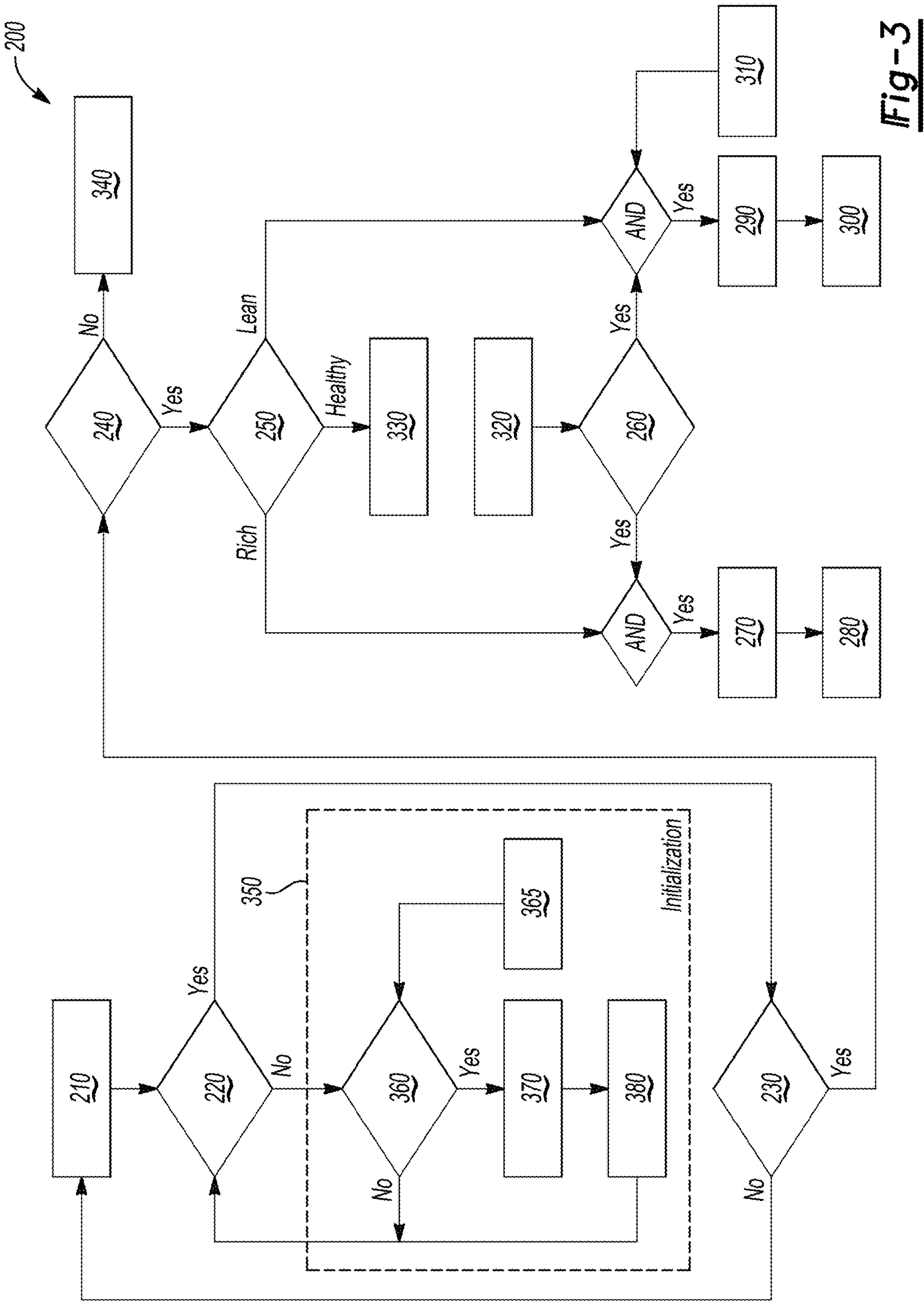
FIG. 3 is a flow chart illustrating a fault detection portion of a method of cylinder knock detection-based fuel injector management for a vehicle according to the present disclosure.
Figure 4:
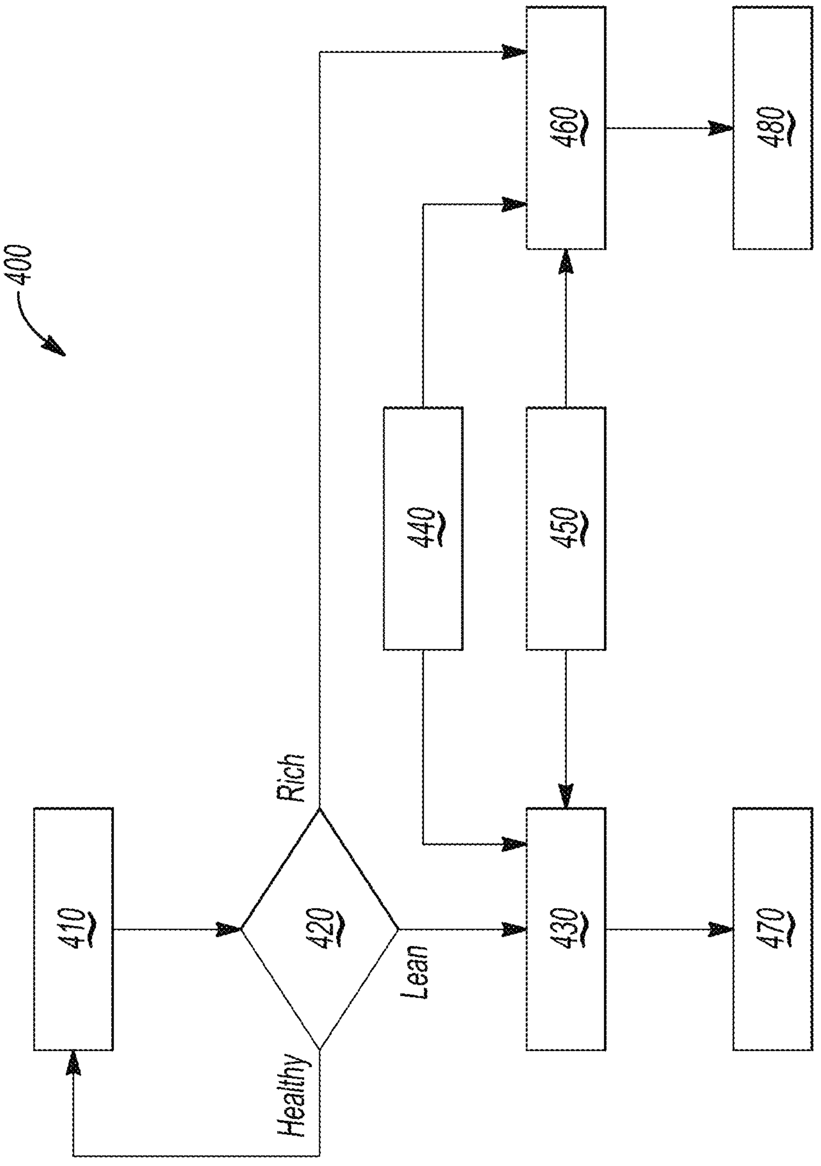
FIG. 4 is a flow chart illustrating a fault management portion of a method of cylinder knock detection-based fuel injector management for a vehicle according to the present disclosure.

As schematically illustrated in FIG. 3, a method 200 of cylinder knock detection-based fuel injector management that utilizes a cylinder knock count of individual cylinders to assess a health of respective individual fuel injectors associated with the individual cylinders is disclosed.

A method 200 of fuel injector management based on cylinder knock detection for an internal combustion engine 14 having a plurality of cylinders $Cyl_{1-n}$, includes: receiving 210, via a controller 30, an individual cylinder knock count $Cyl_{1\text{-}Knock}$ from each of the plurality of cylinders $Cyl_{1-n}$.

The plurality of cylinders $Cyl_{1-n}$ includes at least a first cylinder $Cyl_1$ and a first fuel injector $Inj_1$ associated with the first cylinder $Cyl_1$. The individual cylinder knock count $Cyl_{1\text{-}Knock}$ for the first cylinder $Cyl_1$ is received from one of a plurality of sensors 50, e.g., a knock sensor, during a current cycle j.

The method 200 further includes determining 220, via the controller 30, whether a knock metric K is initialized for the first cylinder $Cyl_1$; determining 230, via the controller 30, whether the knock metric K for the first cylinder $Cyl_1$ deviates during the current cycle j from an established baseline knock metric u for the first cylinder $Cyl_1$ when it is determined at 220 that the knock metric K is initialized for the first cylinder $Cyl_1$; determining 240, via the controller 30, whether the knock metric K for the first cylinder $Cyl_1$ is decreasing with respect to the established baseline knock metric u for the first cylinder $Cyl_1$ when it is determined at 230 that the knock metric K for the first cylinder $Cyl_1$ deviates from the established baseline knock metric u for the first cylinder $Cyl_1$; determining 250, via the controller 30, whether a fuel system long term memory indicates one of rich, lean or healthy when it is determined at 240 that the knock metric K for the first cylinder $Cyl_1$ is decreasing with respect to the established baseline knock metric u for the first cylinder $Cyl_1$; determining 260, via the controller 30, whether a knock adaptation control 320 indicates a reduction of knock for the first cylinder $Cyl_1$; identifying 270, 420, via the controller 30, the first fuel injector $Inj_1$ as shifted rich when it is determined 250 that the fuel system long term memory indicates rich, and the knock adaptation control 320 indicates the reduction of knock for the first cylinder $Cyl_1$; and providing 280, via the controller 30, an alert when a rich residual metric exceeds a rich threshold metric when the first injector is identified as shifted rich.

When a fuel injector is identified as shifted rich, the fuel injector may, for example, be leaky, which may result in a loss of refined fuel control, and an increase in fuel delivered to a cylinder.

By identifying affected fuel injectors, for example those shifted rich, steps may be taken to manage the adverse effects of operating a vehicle with shifted fuel injectors, for example, when a fuel injector is identified as shifted rich, a fuel injector specific pulse width may be decreased and/or delayed to decrease a quantity of fuel delivered, or a rail pressure may be decreased if the fuel injector is found to be leaking.

Rich residual metrics may be calculated by the controller 30 for each cycle and compared with boundaries defined by calibration and stored in the memory 40. Rich threshold metrics are defined by calibration and define boundaries with respect to performance of a given part, for example but not limited to a fuel injector.

According to one aspect of the disclosure, the method 200 includes: receiving 210, via the controller 30, the individual cylinder knock count $Cyl_{1\text{-}Knock}$ from each of the plurality of cylinders $Cyl_{1\text{-}n}$, when it is determined at 230 that the knock metric K for the first cylinder $Cyl_1$ does not deviate from the established baseline knock metric μ for the first cylinder $Cyl_1$ prior to determining at 220 whether the knock metric K is initialized.

According to one aspect of the disclosure, the method 200 includes: providing 340, via a controller 30, a first indicator, which may be indicative of, for example but not limited to, a combustion related event, when it is determined at 240 that the knock metric K for the first cylinder $Cyl_1$ is not decreasing with respect to the established baseline knock metric μ for the first cylinder $Cyl_1$, and/or providing 330, via the controller 30, a second indicator, which may be indicative of, for example but not limited to, a spark related event, when it is determined at 250 that the fuel system long term memory indicates healthy.

The method 200 further includes: determining 310, via the controller 30, whether multiple misfires have been registered for the first cylinder $Cyl_1$, when it is determined at 250 that the fuel system memory indicates lean; identifying 290, via the controller 30, the first fuel injector $Inj_1$ as shifted lean, when it is determined at 250 that the fuel system memory indicates lean, multiple misfires have been registered for the first cylinder $Cyl_1$ at 310, and the knock adaptation control 320 indicates the reduction of knock at 260 for the first cylinder $Cyl_1$; and providing 300, via the controller 30, an alert when a lean residual metric exceeds a lean threshold metric when the first injector $Inj_1$ is identified as shifted lean.

When a fuel injector is identified as shifted lean, the fuel injector may, for example, be plugged, which may result in a loss of refined fuel control, and a decrease in fuel delivered to a cylinder.

By identifying affected fuel injectors, for example, those shifted lean, steps may be taken to manage the adverse effects of operating a vehicle with shifted fuel injectors, for example, when a fuel injector is identified as shifted lean, a rail pressure may be increased to compensate for the reduced flow, and/or operating conditions where higher fuel masses are required may be limited and/or avoided.

Lean residual metrics may be calculated by the controller 30 for each cycle and compared with boundaries defined by calibration and stored in the memory 40. Lean threshold metrics are defined by calibration and define boundaries with respect to performance of a given part, for example but not limited to a fuel injector.

The method 200 further includes: updating 410, via the controller 30, a health status of the first fuel injector $Inj_1$.

Updating 410 the health status of the first fuel injector $Inj_1$ includes: calculating 460, via the controller 30, an allowable range of fuel injector pulse widths based on a fuel injector degradation factor 440 and fuel injector nominal performance data 450 when the first fuel injector $Inj_1$ is identified at 270, 420 as shifted rich; and calculating 430, via the controller 30, the allowable range of fuel injector pulse widths and operating pressures based on the fuel injector degradation factor 440 and fuel nominal performance data when the first fuel injector is identified at 290 as shifted lean.

The fuel injector degradation factor 440 is calculated based upon a current long term multiplier, a nominal long term multiplier, and a total number of fuel injectors identified as shifted rich and/or shifted lean.

The current long term multiplier, and the nominal long term multiplier are based on calibration, and stored in the memory 40 of the controller 30.

The method 200 may further include increasing 480, via the controller 30, an engine idle speed when the first fuel injector $Inj_1$ is identified at 270, 420 as shifted rich, and/or increasing 470 an engine idle speed, reducing a torque, and/or reducing a maximum allowable engine speed, via the controller 30, when the first fuel injector $Inj_1$ is identified at 290 as shifted lean.

Increasing the engine idle speed increases the pulse width of a fuel injector identified as shifted lean (i.e., the affected injector), while increasing the engine idle speed increases the pulse width of fuel injectors not identified as shifted rich (i.e., the non-affected injectors) to increase their performance.

Reducing the torque decreases the pulse width of a fuel injector identified as shifted lean, as does reducing a maximum allowable engine speed.

In vehicles equipped with Active Fuel Management (AFM), fuel injectors identified as shifted lean may be deactivated, while fuel injectors identified as shifted rich remain activated.

According to one aspect of the disclosure, the method 200 further includes: initializing 350, via the controller 30, the knock metric K for the first cylinder $Cyl_1$ when it is determined at 220 that the knock metric K for the first cylinder $Cyl_1$ is not initialized.

Initializing 350 the knock metric K for the first cylinder $Cyl_1$ when is it determined at 220 that the knock metric K for the first cylinder $Cyl_1$ is not initialized includes: determining 360, via the controller 30, whether a sum of the individual knock counts for the plurality of cylinders $Cyl_{1\text{-}n}$ during the current cycle j is greater than a knock threshold ($T_{Knock}$) 365; determining 370, via the controller 30, a cylinder specific knock metric $$K_i^j$$

for the first cylinder $Cyl_1$ for the current cycle j and establishing, via the controller 30, a baseline knock metric μ for the first cylinder $Cyl_1$ for the current cycle j; determining 380, via the controller 30, a weighted average knock metric $$\mu_i^j$$

for the first cylinder $Cyl_1$ based on the current cycle j; and repeating, via the controller 30, the initialization 350 of the knock metric K for the first cylinder $Cyl_1$ for at least one more cycle until the knock metric K is initialized.

The sum of the individual knock counts of the plurality of cylinders $Cyl_{1\text{-}n}$ for the current cycle j is determined based upon a formula 1, which is defined as:

$$\sum_{i=1}^{n} \sum Cyl_{i-Knock} \qquad [1]$$

where: i=a cylinder number from 1 to n;

n=a total number of cylinders in the plurality of cylinders; and $Cyl_{i\text{-}Knock}$=a total number of knock events for cylinder i.

The knock threshold $T_{Knock}$ is a calibratable value that is greater than one.

The cylinder specific knock count $$K_i^j$$

is determined based on a formula 2, which is defined as:

$$K_i^j = \frac{\sum Cyl_{i-Knock}}{\sum_{i=1}^{n} \sum Cyl_{i-Knock}} \quad [2]$$

where: K=a knock count i=a cylinder number from 1 to n;

j=the current cycle;

n=a total number of cylinders in the plurality of cylinders; and $Cyl_{i-Knock}$=a total number of knock events for cylinder i.

The weighted average knock ratio $$\mu_i^j$$

is determined based on a formula 3, which is defined as:

$$\mu_i^j = \alpha \cdot \mu_i^{j-1} + \beta \cdot K_i^j \quad [3]$$

where: μ=a knock ratio;

i=a cylinder number from 1 to n;

j=the current cycle;

α and β=scalar non-negative weights, such that α+β=1; and

K=a knock count.

According to one aspect of the disclosure, the baseline knock ratio μ is established after a predetermined number of cycles N.

According to one aspect of the disclosure, the method 200 further includes: determining 360, via the controller 30, whether the knock metric K is initialized when it is determined at 360 that the sum of the individual knock counts for each of the plurality of cylinders during the current cycle is less than or equal to the knock threshold $T_{knock}$.

While the discussion above is directed to the first cylinder $Cyl_1$ of the plurality of cylinders $Cyl_{1-n}$, it should be appreciated that the disclosed method is applicable to each cylinder of the plurality of cylinders $Cyl_{1-n}$. Furthermore, while FIGS. 2A and 2B, schematically illustrate a cylinder head 110 including four (4) cylinders, it should be appreciated that an internal combustion engine could have more than one cylinder head, and each cylinder head may have more or less than the four (4) cylinders illustrated.

A fuel injector management system based on cylinder knock detection is also disclosed. The fuel injector management system includes an internal combustion engine 14 having a plurality of cylinders $Cyl_{1-n}$, and a plurality of fuel injectors $Inj_{1-n}$ associated with the plurality of cylinders $Cyl_{1-n}$, a plurality of sensors 50; and a controller 30 having a memory 40. The controller 30 is in communication with the internal combustion engine 14 and the plurality of sensors 50.

The controller is configured to: receive 210 an individual cylinder knock count $Cyl_{i-Knock}$ from each of the plurality of cylinders $Cyl_{1-n}$, wherein the plurality of cylinders $Cyl_{1-n}$ includes at least a first cylinder $Cyl_1$ and a first fuel injector $Inj_1$ associated with the first cylinder $Cyl_1$. The individual cylinder knock count $Cyl_{1-Knock}$ for the first cylinder $Cyl_1$ is received from a knock sensor (included in the plurality of sensors 50) during a current cycle j.

The controller 30 is further configured to: determine 220 whether a knock metric K is initialized for the first cylinder $Cyl_1$; determine 230 whether the knock metric K for the first cylinder $Cyl_1$ deviates from an established baseline knock metric μ for the first cylinder $Cyl_1$ during the current cycle j when it is determined at 220 that the knock metric K is initialized for the first cylinder $Cyl_1$; determine 240 whether the knock metric K for the first cylinder $Cyl_1$ is decreasing with respect to the established baseline knock metric μ for the first cylinder $Cyl_1$ when it is determined at 230 that the knock metric K for the first cylinder $Cyl_1$ deviates from the established baseline knock metric μ for the first cylinder $Cyl_1$; determine 250 whether a fuel system long term memory indicates one of rich, lean or healthy when it is determined at 240 that the knock metric K for the first cylinder $Cyl_1$ is decreasing with respect to the established baseline knock metric μ for the first cylinder $Cyl_1$; determine whether a knock adaptation control 320 indicates a reduction of knock at 260 for the first cylinder $Cyl_1$; identify 270, 420 the first fuel injector $Inj_1$ as shifted rich when it is determined at 250 that the fuel system long term memory indicates rich, and the knock adaptation control 320 indicates the reduction of knock at 260 for the first cylinder $Cyl_1$; provide 280 an alert when a rich residual metric exceeds a rich threshold metric when the first injector $Inj_1$ is identified as rich; determine 310 whether multiple misfires have been registered for the first cylinder $Cyl_1$, when it is determined at 250 that the fuel system memory indicates lean; identify 290 the first fuel injector $Inj_1$ as shifted lean, when it is determined at 250 that the fuel system memory indicates lean, multiple misfires have been registered at 310 for the first cylinder $Cyl_1$, and the knock adaptation control 320 indicates the reduction of knock at 260 for the first cylinder $Cyl_1$; and provide 300 an alert when a lean residual metric exceeds a lean threshold metric when the first injector $Inj_1$ is identified at 290 as lean.

The controller 30 is further configured to: update 410 a health status of the first fuel injector $Inj_1$. Updating 410 the health status of the first fuel injector $Inj_1$ includes: calculating 460 an allowable range of fuel injector pulse widths based on a fuel injector degradation factor 440 and fuel injector nominal performance data 450 when the first fuel injector $Inj_1$ is identified at 270, 420 as shifted rich; and calculating 430 the allowable range of fuel injector pulse widths and operating pressures based on the fuel injector degradation factor 440 and fuel nominal performance data when the first fuel injector $Inj_1$ is identified at 290 as shifted lean.

A vehicle 10 having the fuel injector management system based on cylinder knock detection in accordance with the method above is also disclosed. The vehicle 10 includes an internal combustion engine 14 having a plurality of cylinders $Cyl_{1-n}$, a controller 30 having a memory 40, and a plurality of sensors 50, which includes, for example but not limited to a knock sensor.

While the vehicle 10 includes an internal combustion engine 14, it should be appreciated that the vehicle 10 may also include an additional power-source 15, such as an electric-motor generator. The power-sources 14 and 15 may act in concert to power the vehicle 10.

As discussed above, when a fuel injector is identified as shifted rich, the fuel injector may, for example, be leaky, which may result in a loss of refined fuel control, and an increase in fuel delivered to a cylinder, and when a fuel injector is identified as shifted lean, the fuel injector may, for example, be plugged, which may result in a loss of refined fuel control, and a decrease in fuel delivered to a cylinder.

Therefore, by providing a method fuel injector management based on cylinder knock detection that utilizes a cylinder knock count of individual cylinders to assess a health of respective individual fuel injectors associated with the individual cylinders, malfunctioning fuel injectors may be more readily identified, trend analysis of the malfunctioning fuel injectors may help assess fault severity, and management of the malfunctioning fuel injectors may minimize the adverse effects of operating a vehicle with shifted fuel injectors.

These and other attendant benefits of the present disclosure will be appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method of fuel injector management based on cylinder knock detection for an internal combustion engine having a plurality of cylinders, the method comprising:

receiving, via a controller, an individual cylinder knock count from each of the plurality of cylinders, wherein the plurality of cylinders includes at least a first cylinder and a first fuel injector associated with the first cylinder, and wherein the individual cylinder knock count for the first cylinder is received from a knock sensor during a current cycle;

determining, via the controller, whether a knock metric is initialized for the first cylinder;

determining, via the controller, whether the knock metric for the first cylinder deviates during the current cycle from an established baseline knock metric for the first cylinder when it is determined that the knock metric is initialized for the first cylinder;

determining, via the controller, whether the knock metric for the first cylinder is decreasing with respect to the established baseline knock metric for the first cylinder when it is determined that the knock metric for the first cylinder deviates from the established baseline knock metric for the first cylinder;

determining, via the controller, whether a fuel system long term memory indicates one of rich, lean or healthy when it is determined that the knock metric for the first cylinder is decreasing with respect to the established baseline knock metric for the first cylinder;

determining, via the controller, whether a knock adaptation control indicates a reduction of knock for the first cylinder;

identifying, via the controller, the first fuel injector as shifted rich when it is determined that the fuel system long term memory indicates rich, and the knock adaptation control indicates the reduction of knock for the first cylinder; and providing, via the controller, an alert when a rich residual metric exceeds a rich threshold metric when the first injector is identified as rich.

2. The method as recited in claim 1, further including:

receiving, via the controller, the individual cylinder knock count from each of the plurality of cylinders, when it is determined that the knock metric for the first cylinder does not deviate from the established baseline knock metric for the first cylinder prior to determining whether the knock metric is initialized.

3. The method as recited in claim 1, further including:

providing, via a controller, a first indicator when it is determined that the knock metric for the first cylinder is not decreasing with respect to the established baseline knock metric for the first cylinder.

4. The method as recited in claim 1, further including:

providing, via the controller, a second indicator when it is determined that the fuel system long term memory indicates healthy.

5. The method as recited in claim 1, further including:

determining, via the controller, whether multiple misfires have been registered for the first cylinder, when it is determined that the fuel system memory indicates lean;

identifying, via the controller, the first fuel injector as shifted lean, when it is determined that the fuel system memory indicates lean, multiple misfires have been registered for the first cylinder, and the knock adaptation control indicated the reduction of knock for the first cylinder; and providing, via the controller, an alert when a lean residual metric exceeds a lean threshold metric when the first injector is identified as lean.

6. The method as recited in claim 5, further including:

updating, via the controller, a health status of the first fuel injector, wherein updating the health status of the first fuel injector includes:

calculating, via the controller, an allowable range of fuel injector pulse widths based on a fuel injector degradation factor and fuel injector nominal performance data when the first fuel injector is identified as shifted rich; and calculating, via the controller, the allowable range of fuel injector pulse widths and operating pressures based on the fuel injector degradation factor and fuel nominal performance data when the first fuel injector is identified as shifted lean.

7. The method as recited in claim 6, wherein the fuel injector degradation factor is calculated based upon a current long term multiplier, a nominal long term multiplier, and a total number of fuel injectors identified as shifted rich and/or shifted lean.

8. The method as recited in claim 7, further including:

increasing, via the controller, an engine idle speed when the first fuel injector is identified as shifted rich.

9. The method as recited in claim 7, further including:

increasing an engine idle speed, reducing a torque, and/or reducing a maximum allowable engine speed, via the controller, when the first fuel injector is identified as shifted lean.

10. The method as recited in claim 1, further including:

initializing, via the controller, the knock metric for the first cylinder when it is determined that the knock metric for the first cylinder is not initialized, wherein initializing the knock metric for the first cylinder when is it determined that the knock metric for the first cylinder is not initialized includes:

determining, via the controller, whether a sum of the individual knock counts for the plurality of cylinders during the current cycle is greater than a knock threshold ($T_{Knock}$);

determining, via the controller, a cylinder specific knock metric for the first cylinder for the current cycle;

establishing, via the controller, a baseline knock metric for the first cylinder for the current cycle;

determining, via the controller, a weighted average knock metric for the first cylinder based on the current cycle; and repeating, via the controller, the initialization of the knock metric for the first cylinder for at least one more cycle until the knock metric is initialized.

11. The method as recited in claim 10, wherein the sum of the individual knock counts of the plurality of cylinders for the current cycle is determined based upon a formula 1, which is defined as:

$$\sum_{i=1}^{n}\sum Cyl_{i-Knock} \quad [1]$$

where: i=a cylinder number from 1 to n;

n=a total number of cylinders in the plurality of cylinders; and $Cyl_{i\text{-}Knock}$=a total number of knock events for cylinder i.

12. The method as recited in claim 10, wherein the $T_{Knock}$ is a calibratable value that is greater than one.

13. The method as recited in claim 10, wherein the cylinder specific knock count $$K_i^j$$

is determined based on a formula 2, which is defined as:

$$K_i^j = \frac{\sum Cyl_{i-Knock}}{\sum_{i=1}^{n}\sum Cyl_{i-Knock}} \quad [2]$$

where: K=a knock count i=a cylinder number from 1 to n;

j=the current cycle;

n=a total number of cylinders in the plurality of cylinders; and $Cyl_{i\text{-}Knock}$=a total number of knock events for cylinder i.

14. The method as recited in claim 10, wherein the weighted average knock ratio $$\mu_j^i$$

is determined based on a formula 3, which is defined as:

$$\mu_i^j = \alpha \cdot \mu_i^{j-1} + \beta \cdot K_i^j \quad [3]$$

where: μ=a knock ratio;

i=a cylinder number from 1 to n;

j=the current cycle;

α and β=scalar non-negative weights, such that α+β=1; and

K=a knock count.

15. The method as recited in claim 10, wherein the baseline knock metric is established after a predetermined number of cycles.

16. The method as recited in claim 10, further including:

determining, via the controller, whether the knock metric is initialized when it is determined that the sum of the individual knock counts for each of the plurality of cylinders during the current cycle is less than or equal to the knock threshold.

17. A fuel injector management system based on cylinder knock detection including:

an internal combustion engine having a plurality of cylinders, and a plurality of fuel injectors associated with the plurality of cylinders;

a plurality of sensors; and a controller having a memory, the controller in communication with the internal combustion engine and the plurality of sensors, wherein the controller is configured to:

receive an individual cylinder knock count from each of the plurality of cylinders, wherein the plurality of cylinders includes at least a first cylinder and a first fuel injector associated with the first cylinder, and wherein the individual cylinder knock count for the first cylinder is received from a knock sensor during a current cycle;

determine whether a knock metric is initialized for the first cylinder;

determine whether the knock metric for the first cylinder during the current cycle deviates from an established baseline knock metric for the first cylinder when it is determined that the knock metric is initialized for the first cylinder;

determine whether the knock metric for the first cylinder is decreasing with respect to the established baseline knock metric for the first cylinder when it is determined that the knock metric for the first cylinder deviates from the established baseline knock metric for the first cylinder;

determine whether a fuel system long term memory indicates one of rich, lean or healthy when it is determined that the knock metric for the first cylinder is decreasing with respect to the established baseline knock metric for the first cylinder;

determine whether a knock adaptation control indicates a reduction of knock for the first cylinder;

identify the first fuel injector as shifted rich when it is determined that the fuel system long term memory indicates rich, and the knock adaptation control indicated the reduction of knock for the first cylinder;

provide an alert when a rich residual metric exceeds a rich threshold metric when the first injector is identified as rich;

determine whether multiple misfires have been registered for the first cylinder, when it is determined that the fuel system memory indicates lean;

identify the first fuel injector as shifted lean, when it is determined that the fuel system memory indicates lean, multiple misfires have been registered for the first cylinder, and the knock adaptation control indicates the reduction of knock for the first cylinder; and provide an alert when a lean residual metric exceeds a lean threshold metric when the first injector is identified as lean.

18. The fuel injector management system as recited in claim 17, wherein the controller is further configured to:

update a health status of the first fuel injector, wherein updating the health status of the first fuel injector includes:

calculate an allowable range of fuel injector pulse widths based on a fuel injector degradation factor and fuel injector nominal performance data when the first fuel injector is identified as shifted rich; and calculate the allowable range of fuel injector pulse widths and operating pressures based on the fuel injector degradation factor and fuel nominal performance data when the first fuel injector is identified as shifted lean.

19. A vehicle having fuel injector management based on cylinder knock detection, the vehicle including:

an internal combustion engine having a plurality of cylinders, and a plurality of fuel injectors associated with the plurality of cylinders, the internal combustion configured to provide power to the vehicle;

a plurality of sensors; and a controller having a memory, the controller in communication with the internal combustion engine and the plurality of sensors, the controller configured to:

receive an individual cylinder knock count from each of the plurality of cylinders, wherein the plurality of cylinders includes at least a first cylinder and a first fuel injector associated with the first cylinder, and wherein the individual cylinder knock count for the first cylinder is received from a knock sensor during a current cycle;

determine whether a knock metric is initialized for the first cylinder;

determine whether the knock metric for the first cylinder during the current cycle deviates from an established baseline knock metric for the first cylinder when it is determined that the knock metric is initialized for the first cylinder;

determine whether the knock metric for the first cylinder is decreasing with respect to the established baseline knock metric for the first cylinder when it is determined that the knock metric for the first cylinder deviates from the established baseline knock metric for the first cylinder;

determine whether a fuel system long term memory indicates one of rich, lean or healthy when it is determined that the knock metric for the first cylinder is decreasing with respect to the established baseline knock metric for the first cylinder;

determine whether a knock adaptation control indicates a reduction of knock for the first cylinder;

identify the first fuel injector as shifted rich when it is determined that the fuel system long term memory indicates rich, and the knock adaptation control indicates the reduction of knock for the first cylinder;

provide an alert when a rich residual metric exceeds a rich threshold metric when the first injector is identified as rich;

determine whether multiple misfires have been registered for the first cylinder, when it is determined that the fuel system memory indicates lean;

identify the first fuel injector as shifted lean, when it is determined that the fuel system memory indicates lean, multiple misfires have been registered for the first cylinder, and the knock adaptation control indicates the reduction of knock for the first cylinder; and provide an alert when a lean residual metric exceeds a lean threshold metric when the first injector is identified as lean.

20. The vehicle as recited in claim 19, wherein the controller is further configured to:

update a health status of the first fuel injector, wherein updating the health status of the first fuel injector includes:

calculate an allowable range of fuel injector pulse widths based on a fuel injector degradation factor and fuel injector nominal performance data when the first fuel injector is identified as shifted rich; and calculate the allowable range of fuel injector pulse widths and operating pressures based on the fuel injector degradation factor and fuel nominal performance data when the first fuel injector is identified as shifted lean.

* * * * *